United States Patent
Oe et al.

(10) Patent No.: US 8,589,644 B2
(45) Date of Patent: Nov. 19, 2013

(54) NON-TRANSITORY MEDIUM, ACCESS CONTROL METHOD, AND INFORMATION PROCESSING APPARATUS

(75) Inventors: Kazuichi Oe, Kawasaki (JP); Tatsuo Kumano, Kawasaki (JP); Yasuo Noguchi, Kawasaki (JP); Kazutaka Ogihara, Kawasaki (JP); Masahisa Tamura, Kawasaki (JP); Yoshihiro Tsuchiya, Kawasaki (JP); Takashi Watanabe, Kawasaki (JP); Toshihiro Ozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 224 days.

(21) Appl. No.: 13/217,552

(22) Filed: Aug. 25, 2011

(65) Prior Publication Data
US 2012/0137086 A1 May 31, 2012

(30) Foreign Application Priority Data

Nov. 26, 2010 (JP) ................................. 2010-264379

(51) Int. Cl.
| | |
|---|---|
| *G06F 12/00* | (2006.01) |
| *G06F 13/00* | (2006.01) |
| *G06F 13/28* | (2006.01) |
| *G06F 9/26* | (2006.01) |
| *G06F 9/34* | (2006.01) |

(52) U.S. Cl.
USPC ............ 711/158; 711/202; 711/173; 711/165

(58) Field of Classification Search
USPC .................. 711/203, 154, 202, 173, 158, 165
See application file for complete search history.

(56) References Cited

U.S. PATENT DOCUMENTS

| | | | | |
|---|---|---|---|---|
| 6,674,598 | B2 * | 1/2004 | Smith | 360/69 |
| 2010/0262762 | A1 * | 10/2010 | Borchers et al. | 711/103 |

FOREIGN PATENT DOCUMENTS

JP        H03-34158        2/1991

* cited by examiner

*Primary Examiner* — Matthew Bradley
*Assistant Examiner* — Rocio Del Mar Perez-Velez
(74) *Attorney, Agent, or Firm* — Fujitsu Patent Center

(57) ABSTRACT

A file server has a conversion table that stores therein, in a corresponding manner, logical addresses specified by a higher-level layer and physical addresses specified by a disk driver that are address information indicative of a storage area in a disk device. The file server accesses the disk device with a storage area indicated by a physical address as an access destination and counts up the number of access requests to each storage area in a given period of time for each of the logical addresses. The file server then updates the conversion table such that the physical addresses are lined up in a descending order of the logical addresses of a higher number of the access requests counted. Thereafter, the file server changes storage areas of data stored in the storage device based on the conversion table updated.

7 Claims, 13 Drawing Sheets

FIG.3

| LOGICAL ADDRESS (GB) | ACCESS COUNTER |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |

FIG.4

| LOGICAL ADDRESS (GB) | PHYSICAL ADDRESS (GB) | STARTING OFFSET (BLOCK NUMBER) |
|---|---|---|
| 0 | 0 | 0 |
| 1 | 1 | 2097152 |
| 2 | 2 | 4194304 |
| 3 | 3 | 6291456 |
| 4 | 4 | 8388608 |
| 5 | 5 | 10485760 |
| 6 | 6 | 12582912 |
| 7 | 7 | 14680064 |
| 8 | 8 | 16777216 |
| 9 | 9 | 18874368 |

FIG.6

| LOGICAL ADDRESS (GB) | ACCESS COUNTER | RANK OF NUMBER OF ACCESSES |
|---|---|---|
| 0 | 200 | 4 |
| 1 | 30 | 7 |
| 2 | 5000 | 2 |
| 3 | 20 | 8 |
| 4 | 10 | 9 |
| 5 | 6000 | 1 |
| 6 | 50 | 5 |
| 7 | 300 | 3 |
| 8 | 40 | 6 |
| 9 | 5 | 10 |

FIG.7

| LOGICAL ADDRESS (GB) | PHYSICAL ADDRESS (GB) | STARTING OFFSET (BLOCK NUMBER) |
|---|---|---|
| 0 | 3 | 6291456 |
| 1 | 6 | 12582912 |
| 2 | 1 | 2097152 |
| 3 | 7 | 14680064 |
| 4 | 8 | 16777216 |
| 5 | 0 | 0 |
| 6 | 4 | 8388608 |
| 7 | 2 | 4194304 |
| 8 | 5 | 10485760 |
| 9 | 9 | 18874368 |

NON-TRANSITORY MEDIUM, ACCESS CONTROL METHOD, AND INFORMATION PROCESSING APPARATUS

CROSS-REFERENCE TO RELATED APPLICATION

This application is based upon and claims the benefit of priority of the prior Japanese Patent Application No. 2010-264379, filed on Nov. 26, 2010, the entire contents of which are incorporated herein by reference.

FIELD

The embodiments discussed herein are directed to access control to files.

BACKGROUND

In recent years, file server systems are known to share data with a plurality of client terminals. Such a file server system includes a storage device such as a disk device that stores therein data to be the subject of access, and an information processing apparatus such as a file server that receives an access request from a client terminal and accesses the disk device.

When such a file server receives access request from a client terminal that uses the file server system, the file server carries out an access to the disk device to obtain data from the disk device and transfers the data to the client terminal. In this process, the file server takes time, from executing the access to the disk device until retrieving the data from the disk device, such as a seek time for moving a head to a track of an access position and a rotational waiting time for the access position on a recording medium to rotate to reach the position of the head. A related art example is described in Japanese Laid-open Patent Publication No. 03-034158.

The file server system described above, however, has a tendency of access performance to deteriorate. For example, when storage areas of data of high access frequency are dispersed on the disk device, the access performance deteriorates. More specifically, when the storage areas of data of high access frequency are dispersed on a disk, the distance between pieces of the data of high access frequency becomes longer, whereby the time for the head to move and the time for the disk to rotate become longer. As a consequence, seek operation and rotational waiting operation takes longer time, whereby the access performance deteriorates.

An example of a tendency of access requests from client terminals in a file server system will be described with reference to FIG. 16. FIG. 16 is an exemplary chart for explaining the tendency of access requests from client terminals. In the example in FIG. 16, the abscissa axis represents an offset uniquely given to an area of a disk device in a unit of 1 GB, and the ordinate axis represents a rate of I/O load caused by an access to full load for each area. The example in FIG. 16 illustrate vertical lines with diamonds, squares, triangles, and Xs at their both ends representing respective load statuses. A line with diamonds represents the load status of each area caused by an access from 0:00 to 5:59 and a line with squares represents the load status of each area by an access from 6:00 to 11:59. A line with triangles represents the load status of each area caused by an access from 12:00 to 17:59 and a line with Xs represents the load status of each area by an access from 18:00 to 23:59.

As indicated in FIG. 16, accesses occur in limited areas and occur in nearly the same areas throughout the day. For example, in the example indicated in FIG. 16, no access occurs for the storage areas of offsets 1386 to 1932. Furthermore, accesses are concentrated only in limited areas making the load high, resulting in a plurality of dispersed areas with high load. For example, in the example indicated in FIG. 16, accesses are concentrated in the storage areas of offsets 378 to 420 and on the storage areas of offsets 1302 to 1344 and these storage areas of concentrated accesses are far apart from one another.

Under such a tendency, as described above, the distance between pieces of the data of high access frequency is long and the time for the head to move and the time for the disk to rotate become longer. As a result, the time it takes for the seek operation and the rotational waiting operation becomes longer, whereby the access performance deteriorates.

As a way to make a seek time and a rotational waiting time short, there is a method for causing a disk controller to move data of high access frequency to an outer circumferential zone of the disk which is faster than an inner circumferential zone of the disk. However, to realize the method of disposing data of high access frequency at the outer circumference of the disk by the disk controller, it is preferable to prepare special hardware for each disk device. The above-described issue is not limited to file servers, and it is common to information processing apparatuses that control an access to storage devices.

SUMMARY

According to an aspect of an embodiment of the invention, a computer-readable, non-transitory medium stores an access control program causing a computer to perform accessing a storage device with a storage area indicated by second address information as an access destination, when a device driver receives an access request to the storage device from a higher-level layer, by referring to a storage module that stores therein a correspondence relationship between a first address specified by kernel and a second address converted from the first address that are address information indicative of a storage area in the storage device and by converting the first address information included in the access request to the second address information; counting number of access requests to each storage area from the higher-level layer to the device driver in a given period of time for each piece of the first address information; updating the correspondence relationship in the storage module such that the second address information is lined up in a descending order of the first address information of a higher number of the access requests counted; and changing storage areas of data stored in the storage device based on the correspondence relationship updated.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a table illustrating an example of a count table;

FIG. 4 is a table illustrating an example of a conversion table;

FIG. 6 is a table illustrating an example of the count table;

FIG. 7 is a table illustrating an example of the conversion table;

DESCRIPTION OF EMBODIMENTS

Preferred embodiments of the present invention will be explained with reference to accompanying drawings.

[a] First Embodiment

In the following embodiment, the configuration and the process flow of a file server according to a first embodiment of the invention will be explained in sequence, and lastly the effect of the first embodiment will be described.

Configuration of File Server

Figure 1:
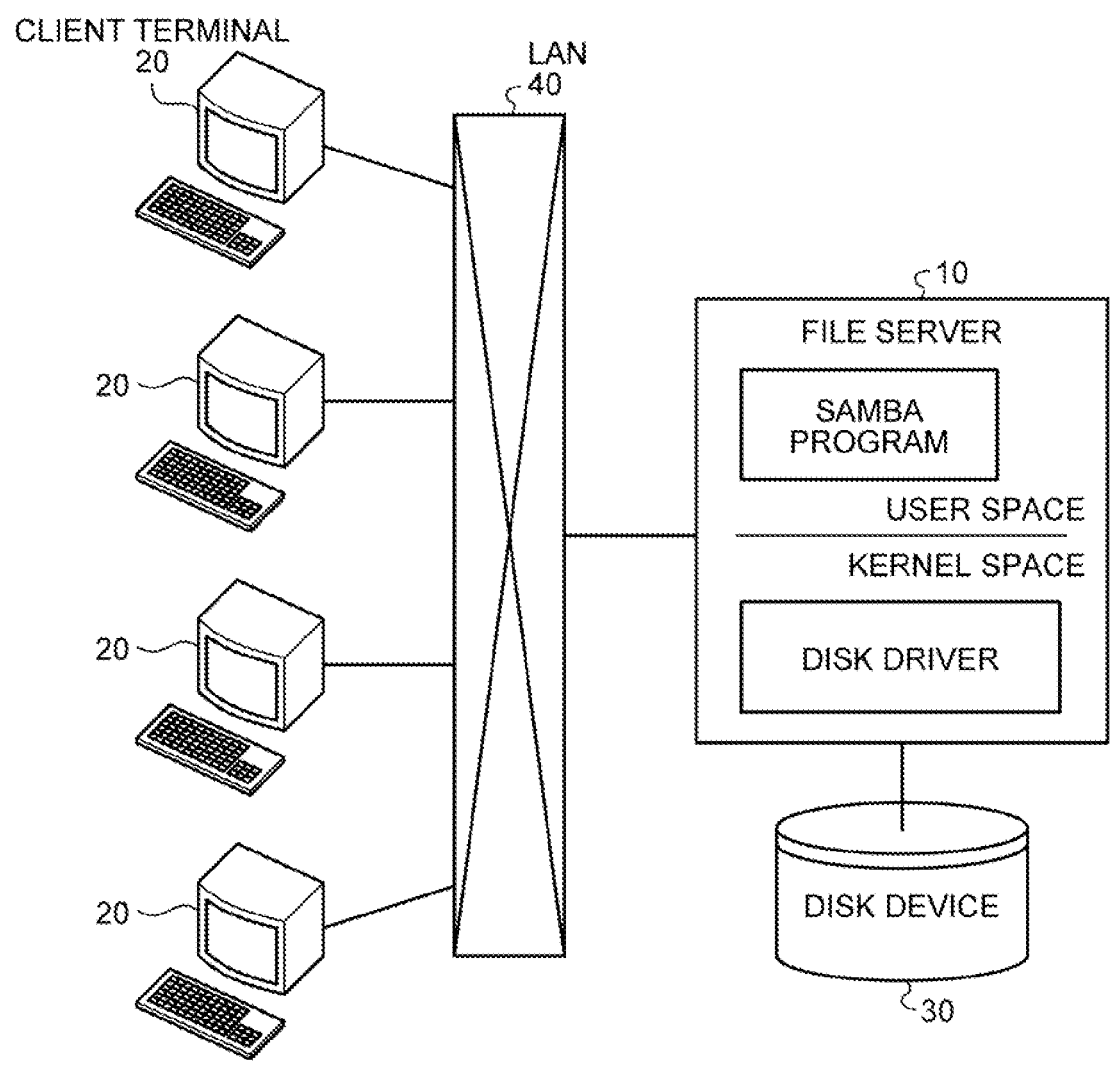
FIG. 1 is a system block diagram illustrating an overall configuration of a system including a file server according to a first embodiment of the invention.

With reference to FIG. 1, a system configuration that is an overall configuration of a system including the file server according to the first embodiment will be described first. FIG. 1 is a system block diagram illustrating the overall configuration of the system including the file server according to the first embodiment. As illustrated in FIG. 1, the system including the file server includes a file server 10, a plurality of client terminals 20, and a disk device 30. The file server 10 is connected with the client terminals 20 via a local area network (LAN) 40.

The file server 10 receives an access request from the client terminal 20 and accesses the disk device 30 in response to the access request. For example, in the file server 10, a samba program as a computer program for receiving access requests is run in a user space. When the file server 10 receives an access request from a client terminal 20, the file server 10 obtains address destination information specifying an access destination and being included in the access request, and notifies a disk driver in a kernel space of the access destination information. The disk driver here is a device driver that controls hardware and is software that relays communications between an operating system (OS) and the hardware.

The disk driver of the file server 10 then executes an access to the disk device 30 in response to the access destination information. The kernel space here is a lower-level layer where basic software runs and functions of the system such as hardware control, task management, file and system management, and network connection are executed. Meanwhile, the user space is a higher-level layer where individual application programs run and computer programs for receiving access requests and the like are running.

The client terminal 20 notifies the file server 10 of the access request to the disk device 30 via the LAN 40 and receives response data to the access request from the disk device 30. The disk device 30 stores therein the data to be the subject of access, and reading or writing of the data is controlled by the file server 10.

Figure 2:
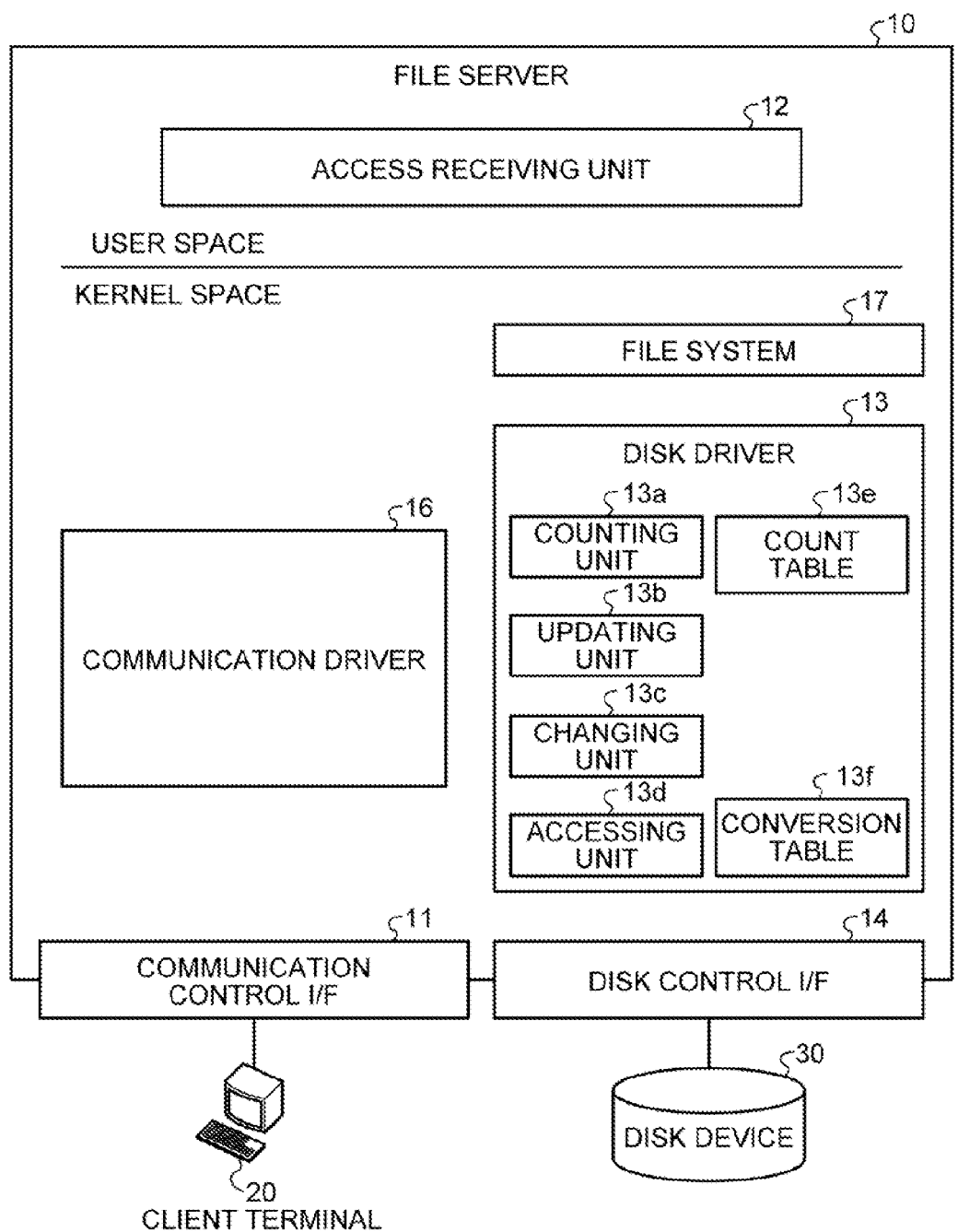
FIG. 2 is a block diagram illustrating a configuration of the file server according to the first embodiment.

With reference to FIG. 2, the configuration of the file server 10 depicted in FIG. 1 will be described. FIG. 2 is a block diagram illustrating the configuration of the file server according to the first embodiment. As indicated in FIG. 2, the file server 10 includes a communication control interface (I/F) 11, an access receiving module 12, a disk driver 13, a disk control I/F 14, a communication driver 16, and a file system 17.

The communication control I/F 11 is a network interface such as a network interface card (NIC), and controls communications concerning various types of information communicated with the client terminals 20 connected. For example, the communication control I/F 11 receives an access request from a client terminal 20 and sends the response data obtained from the disk device 30 to the client terminal 20 by executing the access. The communication driver 16 is software for controlling a communication device and controls communications with the client terminals 20. For example, the communication driver 16 notifies the access receiving module 12 of the access request received via the communication control I/F 11 and sends the response data obtained from the disk device 30 to the corresponding client terminal 20 via the communication control I/F 11.

The access receiving module 12 receives access requests from the client terminals 20. For example, the access receiving module 12 receives an access request from a client terminal 20 by running the samba program, which is an application to receive access requests, from the client terminals 20. The access receiving module 12 then notifies the disk driver 13 of the access request via the file system 17 in the lower-level layer. The file system 17 is software that manages the data stored in the disk device 30.

The access requests from the client terminal 20 will be described in detail. Examples of the access requests notified to the disk driver 13 include a request to read data from the disk device 30 (so-called a read request) and a request to write data to the disk device 30 (so-called a write request). The read request includes, for example, address information indicative of the position to read in the disk device and a data size indicative of the size of the data read out from the position of access. The address information is an address of a certain disk area in the disk driver, and is a block offset from the start that is specified, for example, in units of block size (e.g., 512 bytes) of the disk device. In this case, for example, an access request including the address information of 1000 means that the position of the 1000th block (512×1000 bytes) is specified from the position of a given starting point of the disk device. In the followings, address information included in the access request and specified by the kernel is referred to as a logical address. Meanwhile, an address converted using a later-described conversion table 13$f$ is referred to as a physical address.

The disk control I/F 14 is an interface such as a small computer system interface (SCSI) card and controls communications concerning the various types of information communicated with the disk device 30 connected. For example, the disk control I/F 14 sends and receives data to be read and written by executing an access to the disk device 30.

The disk driver 13 controls an access to the disk device 30 as software for controlling the disk device 30 and includes a counting module 13a, an updating module 13b, a changing module 13c, and an accessing module 13d. The disk driver 13 further includes a count table 13e and the conversion table 13f. The process performed by each of the modules will be explained hereinafter.

The count table 13e stores therein the number of access requests having occurred for each logical address that is the address information indicative of a storage area in the disk device 30 and is specified by the kernel. For example, the count table 13e, as illustrated in FIG. 3, stores therein logical addresses and access counters that indicate the number of access requests made to the corresponding logical address in a corresponding manner. For example, the logical address is managed in units of 1 GB (gigabytes). For example, each logical address 0 indicated in FIG. 3 means inclusion of the respective logical addresses of the storage areas from the position of a given starting point of the disk device 30 up to 1 GB specified by the kernel. The example indicated in FIG. 3 is in a state of initial values, and thus the values of the access counters are all zeros. FIG. 3 is a table illustrating an example of the count table.

The conversion table 13f stores therein, in a corresponding manner, logical addresses specified by the kernel and physical addresses specified by the disk driver 13 that are both address information indicative of storage areas in the disk device 30, and starting offsets that are the position of the starting point of the storage area indicated by the corresponding physical address. For example, in the conversion table 13f, as indicated in FIG. 4, the logical addresses, the physical addresses, and the starting offsets are stored in a corresponding manner. For example, the logical addresses and the physical addresses are managed in units of 1 GB (gigabytes). The starting offsets are managed in block units of 512 bytes.

For example, the logical address 0 indicated in FIG. 4 means inclusion of the respective logical addresses of the storage areas from the position of a given starting point of the disk device 30 up to 1 GB specified by the kernel. Furthermore, the physical address 0 indicated in FIG. 4 means inclusion of the respective physical addresses of the storage areas from the position of a given starting point of the disk device 30 up to 1 GB specified by the disk driver 13. In the example in FIG. 4, the conversion table 13f is in an initial state, and thus the logical addresses and the physical addresses are in the same range of storage areas. FIG. 4 is a table illustrating an example of the conversion table.

The starting offset 0 indicated in FIG. 4 means that the position of a given starting point of the disk device 30 for the physical address 0 is located at the 0th block. More specifically, in the example in FIG. 4, the physical address 0 indicates inclusion of the respective physical addresses of the storage areas from the 0th block of the disk device 30 up to the 2097151st block. Furthermore, the physical address 1 indicates inclusion of the respective physical addresses of the storage areas from the 2097152nd block of the disk device 30 up to the 4194303th block.

The counting module 13a counts the number of access requests to each of the storage areas for each logical address in a given period of time. For example, when an access request is received from an application of a higher-level than the disk driver 13, the counting module 13a identifies the logical address indicative of the storage area in the data to be the subject of access. The counting module 13a then counts up the access counter in the count table 13e for the logical address at which accesses have occurred. Thereafter, the counting module 13a carries out such counting process of the number of accesses until a given time (for example, 2:00 a.m.).

For example, when an access to the logical address of 1.5 GB occurs as an access request from a higher-level application, which means an access to the storage areas corresponding to the logical address 1, the counting module 13a counts up the number of accesses for the logical address 1.

The updating module 13b updates the conversion table 13f such that physical address information is lined up in a descending order of the logical addresses of a higher number of access requests counted by the counting module 13a. For example, at 2:00 a.m., the updating module 13b refers to the count table 13e and determines the ranking of the number of accesses in a descending order of the logical addresses of a higher count. The updating module 13b then updates the conversion table 13f such that the physical address information is lined up in a descending order of the logical addresses of a higher number of access requests counted. While it will be described later in detail with reference to FIG. 5, a daemon 15 in the higher-level layer monitors whether it comes to 2:00 a.m. and, at 2:00 a.m., the daemon 15 instructs the updating module 13b of the disk driver 13 to carry out the updating process.

The process performed by the updating module 13b will be explained using the examples in FIGS. 6 and 7. FIG. 6 is a table illustrating an example of the count table. FIG. 7 is a table illustrating an example of the conversion table. In the example in FIG. 6, the count table 13e stores therein the number of accesses to the logical address 0 being 200, the number of accesses to the logical address 1 being 30, and the number of accesses to the logical address 2 being 5000. Furthermore, the count table 13e stores therein the number of accesses to the logical address 3 being 20, the number of accesses to the logical address 4 being ten, and the number of accesses to the logical address 5 being 6000. The count table 13e stores therein the number of accesses to the logical address 6 being 50, and the number of accesses to the logical address 7 being 300. The count table 13e stores therein the number of accesses to the logical address 8 being 40, and the number of accesses to the logical address 9 being five.

The updating module 13b then ranks the logical addresses in a descending order of the number of accesses using the values of the access counter for each of the logical addresses stored in the count table 13e. For example, in the example in FIG. 6, the updating module 13b ranks the logical address 5 as the first because it has the largest number of accesses, and ranks the logical address 2 of the next largest number of accesses as the second.

The updating module 13b then assigns the physical addresses of smaller values to the ranks in a descending order of the logical addresses of a higher number of accesses. The physical addresses here correspond to the disk offsets and thus indicate that the smaller the value, the further towards the outer circumference of the disk device they are stored. More specifically, the updating module 13b updates the conversion table 13f such that the physical addresses are lined up from the outer circumference of the disk device 30 towards the inner circumference thereof in a descending order of the logical addresses of a higher number of access requests counted.

An example will be explained using FIG. 7. The updating module 13b assigns the physical address 0 to the logical address 5 of the largest number of accesses, and assigns the physical address 1 to the logical address 2 of the next largest number of accesses. The updating module 13b then assigns the physical addresses 2, 3, 4, and so on in sequence to the logical addresses in a descending order of the logical addresses of a higher number of accesses.

The changing module 13c changes the storage areas of the data stored in the disk device 30 based on the conversion table 13f updated by the updating module 13b. For example, when the conversion table 13f is updated by the updating module 13b, the changing module 13c refers to the correspondence relationship between the logical addresses and the physical addresses stored in the conversion table 13f. The changing module 13c then moves the data stored in the disk device 30 such that the areas of smaller physical address values are assigned in a descending order of the logical addresses of a higher number of accesses and changes the storage areas of the data accordingly.

An example will be explained with the conversion table 13f in FIG. 4 before being updated and the conversion table 13f in FIG. 7 after being updated. Because the physical address corresponding to the logical address 0 is updated from 0 to 3, the changing module 13c moves the data in the storage area corresponding to the physical address 0 in the disk device 30 to the storage area corresponding to the physical address 3. More specifically, the changing module 13c refers to the conversion table 13f and, when the physical address is updated from 0 to 3, moves the data stored in the storage areas from the 0th block of the disk device 30 up to the 2097151st block to the storage areas from the 6291456th block up to the 8388607th block.

The accessing module 13d refers to the conversion table 13f when the disk driver 13 receives an access request to the disk device 30 from the higher-level layer, and converts the logical address included in the access request to a physical address. The accessing module 13d then accesses the disk device 30 with the storage area indicated by the physical address as an access destination. For example, when an access request is received from an application of the higher level, the accessing module 13d converts the logical address included in the access request to a physical address and accesses the disk device 30 with the storage area indicated by the physical address as an access destination.

The accessing module 13d receives the starting offset and the data size as the logical address that specifies the access destination and is included in the access request from the higher-level application. The accessing module 13d then refers to the conversion table 13f to convert the value of the starting offset to the physical address.

An example will be explained with the conversion table 13f in FIG. 7 and the accessing module 13d receiving an access request from an application requesting data with a starting offset of 5.5 GB and a data size of 0.2 GB. In this case, because of the starting offset being 5.5 GB, the accessing module 13d determines that it corresponds to the logical address 5. The accessing module 13d then refers to the conversion table 13f and, because of the physical address corresponding to the logical address 5 being 0, converts the starting offset from 5.5 GB to 0.5 GB. The accessing module 13d then executes an access to the data areas whose starting offset is 0.5 GB and data size is 0.2 GB in the disk device 30.

Another example will be explained with the conversion table 13f in FIG. 7 and the accessing module 13d receiving an access request from an application requesting data with a starting offset of 0.7 GB and a data size of 0.2 GB. In this case, because of the starting offset being 0.7 GB, the accessing module 13d determines that it corresponds to the logical address 0. The accessing module 13d then refers to the conversion table 13f and, because of the physical address corresponding to the logical address 0 being 3, converts the starting offset from 0.7 GB to 3.7 GB. The accessing module 13d then executes an access to the data areas whose starting offset is 3.7 GB and data size is 0.2 GB in the disk device 30.

Figure 5:
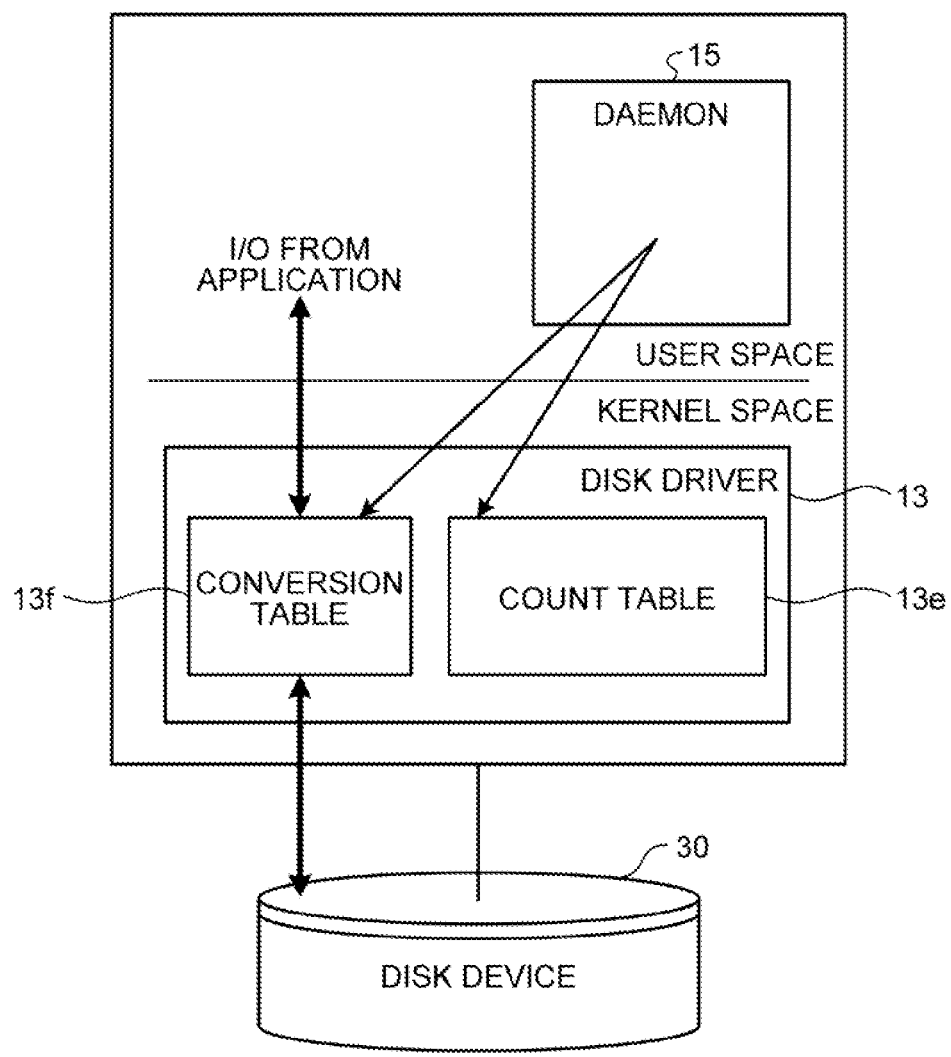
FIG. 5 is a diagram for explaining the process performed by a disk driver in the file server.

With reference to FIG. 5, the process performed by the disk driver 13 receiving an access request from a higher-level application and accessing the disk device will be explained. FIG. 5 is a diagram for explaining the process performed by the disk driver in the file server. As illustrated in FIG. 5, the disk driver 13 operating in the kernel space receives an access request (indicated as I/O in FIG. 5) from an application in the higher-level layer in the user space. The disk driver 13 then converts the logical address included in the access request to a physical address to carry out the access to the physical address in the disk device 30.

As illustrated in FIG. 5, in the file server 10, the daemon 15, which is a computer program operated in background on the OS, is in operation. Such daemon 15 notifies, at a certain time interval, the disk driver 13 of start instructions for the updating process of the conversion table 13f and the changing process of the data storage areas in the disk device 30. For example, every time it comes to 2:00 a.m., the daemon 15 notifies the disk driver 13 of instructions to start the updating process of the conversion table 13f and the changing process of the data storage areas in the disk device 30.

Figure 8:
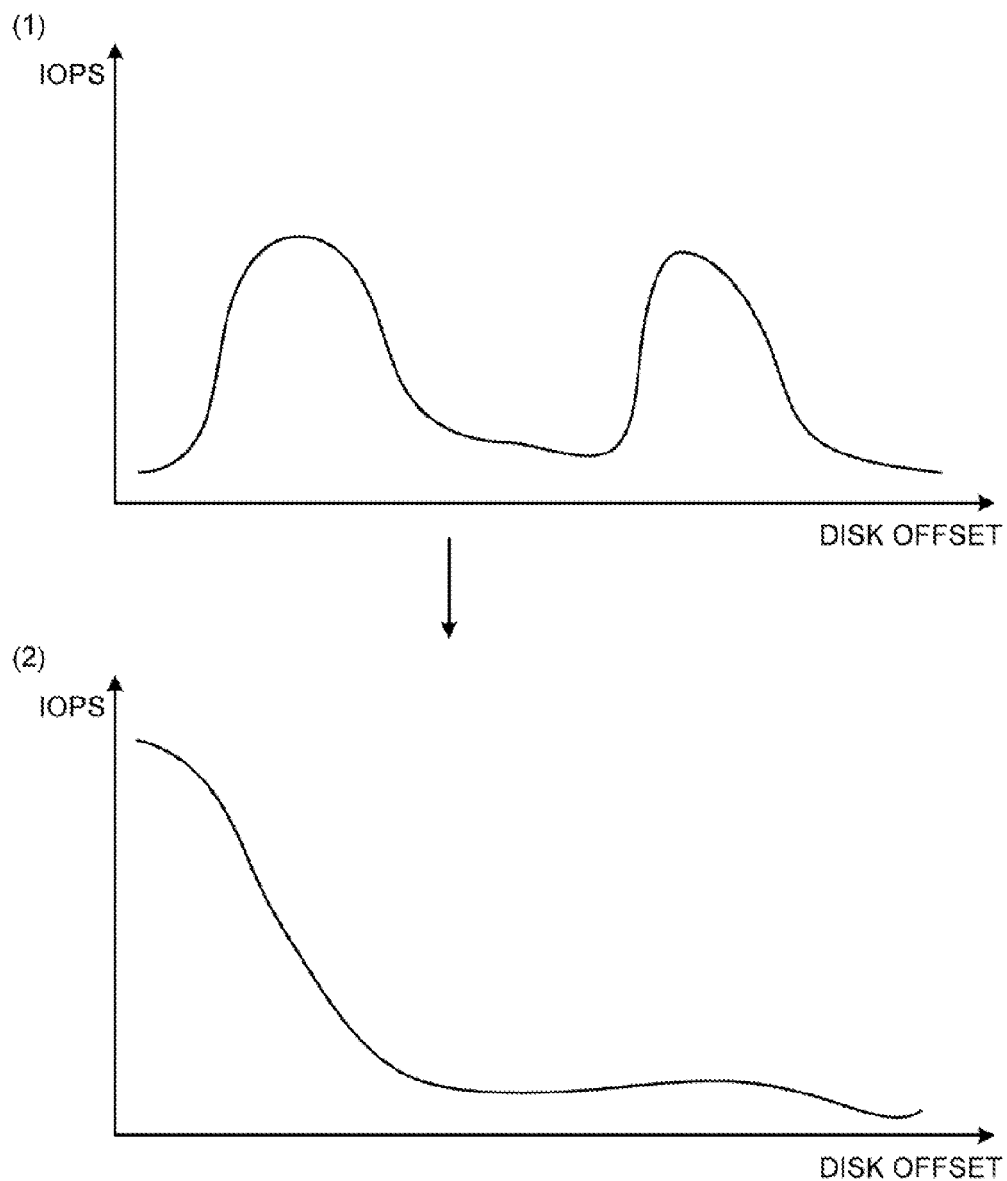
FIG. 8 is a graph for explaining iops of data storage areas after a changing process.

As described in the foregoing, as a result of the storage areas in the disk device 30 being restructured by the disk driver 13 changing the storage areas of data, the storage areas for data of high access frequency (hereinafter, referred to as hot spots) can be concentrated in specific areas on the disk device 30. With reference to FIG. 8, the changes in input/output operations per second (iops) at each disk offset of the disk device 30 after the changing process of the data storage areas will be explained. The iops here indicates the number of I/O (process of read/write) available per second. In the example in FIG. 8, the abscissa axes represent the disk offset uniquely indicative of each storage area in the disk device 30 and the ordinate axes represent the iops at each disk offset.

As illustrated in FIG. 8(a), before carrying out the changing process of the data storage areas, there are two hot spots of high iops value being dispersed. As illustrated in FIG. 8(b), after the changing process of the data storage areas is carried out by the disk driver 13 of the file server 10, the hot spots are concentrated in the storage areas whose disk offsets are small. Consequently, the file server 10 according to the first embodiment can enhance the access performance and suppress CPU load during an access to the disk device 30.

Process by File Server

Figure 9:
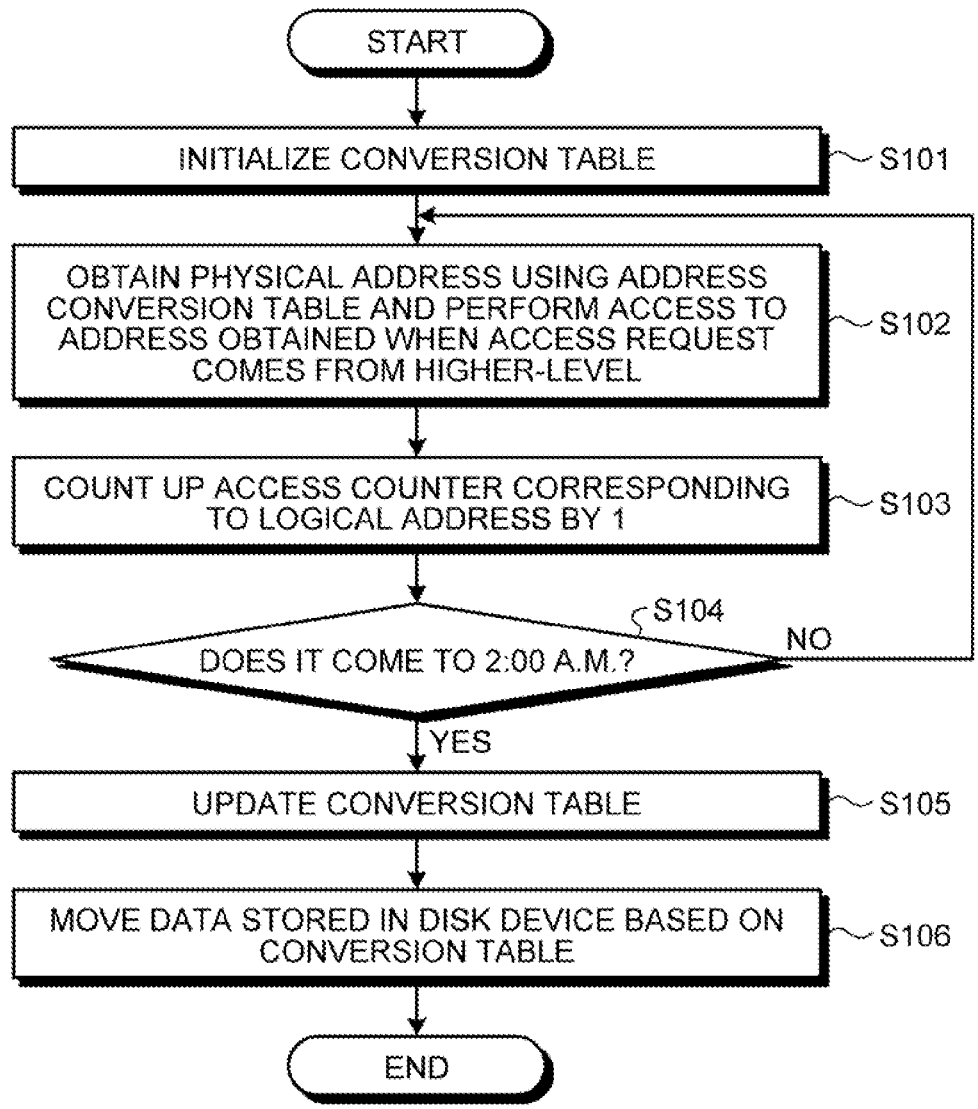
FIG. 9 is a flowchart illustrating a processing operation of the file server according to the first embodiment.

With reference to FIG. 9, the process by the file server 10 according to the first embodiment will be explained. FIG. 9 is a flowchart illustrating the processing operation of the file server according to the first embodiment.

As illustrated in FIG. 9, the disk driver 13 of the file server 10 first initializes the conversion table 13f (step S101), and waits for an access request from an application of the higher level. When an access request is received from an application, the disk driver 13 refers to the conversion table 13f to convert the logical address included in the access request to a physical address. The disk driver 13 then accesses the disk device 30 with the storage area indicated by the physical address as an access destination (step S102).

While receiving access requests from an application, the disk driver 13 counts up the number of access counts in the count table 13e for the logical address at which accesses have occurred (step S103).

The file server 10 determines whether it comes to 2:00 a.m. (step S104). For example, the daemon 15 of the file server 10 determines whether it comes to 2:00 a.m. and, before it comes to 2:00 a.m. (No at step S104), the process returns to S102. On the other hand, when the daemon 15 of the file server 10 determines that it comes to 2:00 a.m. (Yes at step S104), the daemon 15 notifies the disk driver 13 of instructions to start the updating process of the conversion table 13f and the changing process of the data storage areas in the disk device 30.

The disk driver 13 then updates the conversion table 13f such that the physical address information is lined up in a descending order of the logical addresses of a higher number of access requests counted (step S105). The disk driver 13 then changes the storage areas of the data stored in the disk device 30 based on the conversion table 13f updated. For example, when the conversion table 13f is updated by the updating module 13b, the changing module 13c refers to the correspondence relationship between the logical addresses and the physical addresses stored in the conversion table 13f to move the data stored in the disk device 30 (step S106).

Effects of First Embodiment

Accordingly, the file server 10 stores data of high access frequency in a concentrated manner in the specific areas on the disk, whereby the access performance can be enhanced.

There is a tendency that accesses occur in limited areas and occur in nearly the same areas throughout the day. Furthermore, there is a tendency that accesses are concentrated only in limited areas making the load high, resulting in a plurality of dispersed areas of such high load. It is further known that such access tendencies hardly fluctuate over a long period of time such as one month. Accordingly, under such tendencies, a method of reordering the physical addresses in a descending order of the logical addresses of a higher number of accesses to store data of high access frequency in a concentrated manner in specific areas on the disk is particularly effective, and thus allows the access performance to be enhanced.

The file server 10 updates the conversion table 13f such that the physical addresses are lined up from the outer circumference of the disk device 30 towards the inner circumference thereof in a descending order of the logical addresses of a higher number of access requests counted. Accordingly, data of high access frequency can be stored concentrated in the storage areas on the outer circumference side of the disk, which is fast compared with the inner circumference thereof, thereby making it possible to enhance the access performance.

[b] Second Embodiment

In the first embodiment above, it has been explained that the unit for logical addresses and physical addresses is exemplified as 1 GB and the unit of data to move in the disk device 30 is also exemplified as 1 GB. However, the embodiment is not restricted to this, and the unit for logical addresses and physical addresses may be changed in response to fluctuations of accesses with time. More specifically, in the file server system, as described in the foregoing, while there is a tendency that accesses are concentrated in some storage areas only, the areas of accesses being concentrated may fluctuate with time in a degree of a few dozens of gigabytes. Accordingly, to absorb the fluctuations of areas where accesses occur with time, the unit for logical addresses and physical addresses is changed in response to the fluctuations of accesses with time.

Figure 10:
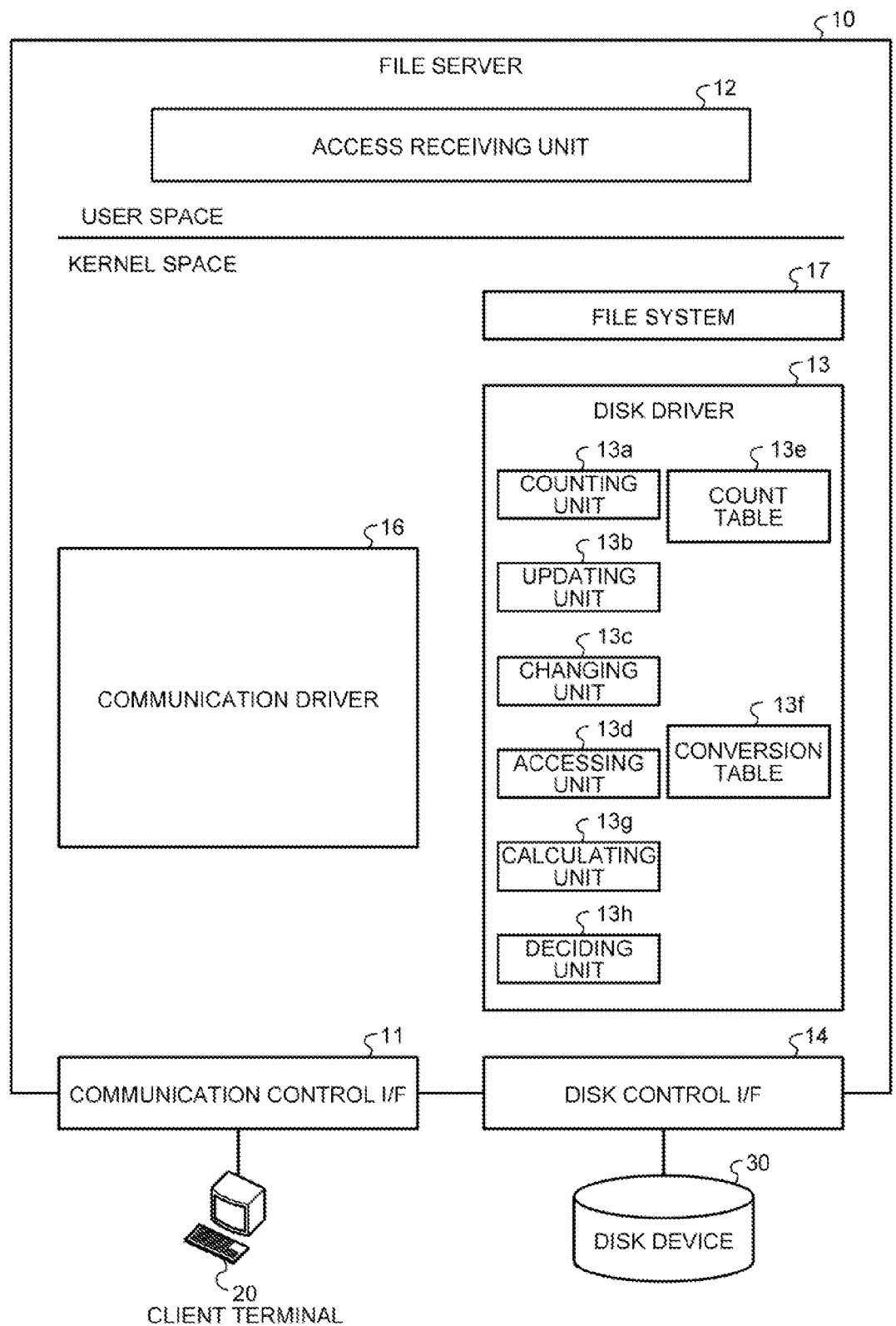
FIG. 10 is a block diagram illustrating a configuration of a file server according to a second embodiment of the invention.
Figure 11:
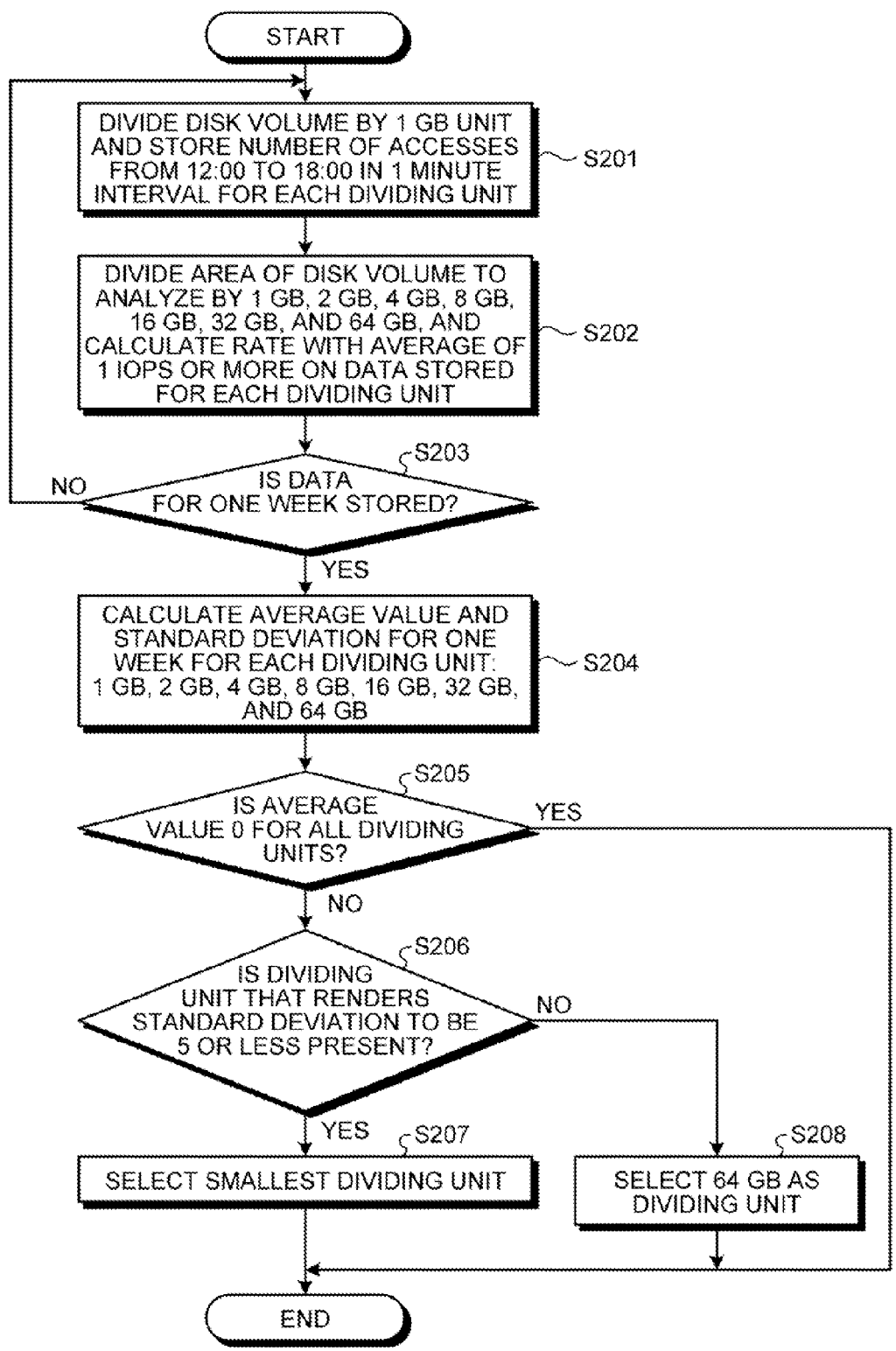
FIG. 11 is a flowchart illustrating the operation of a dividing unit changing process performed by the file server according to the second embodiment.
Figure 12:
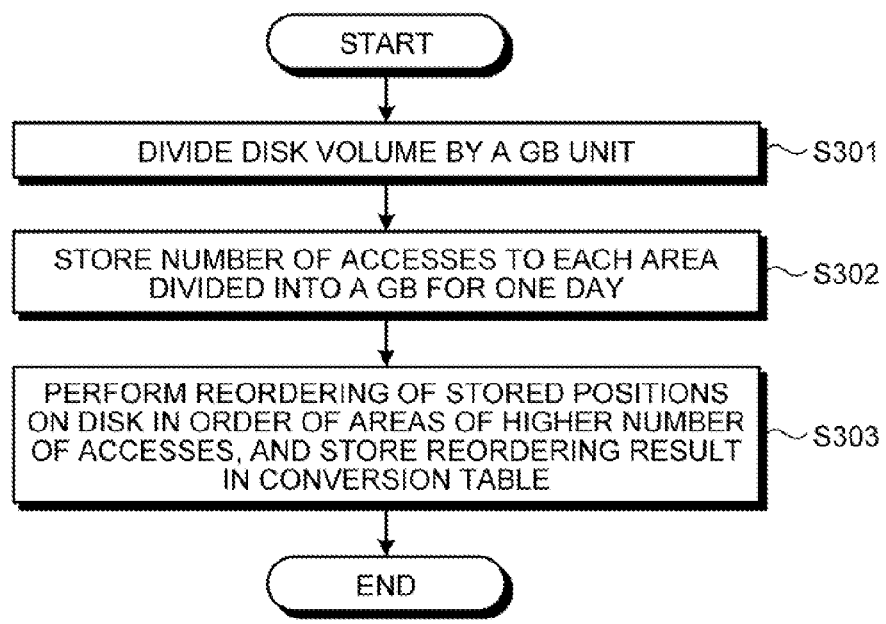
FIG. 12 is a flowchart illustrating a processing operation of the file server according to the second embodiment.

A second embodiment of the invention in the followings provides an example of changing the unit for logical addresses and physical addresses in response to the fluctuations of accesses with time and changing the unit for the logical addresses and the physical addresses and the unit of data to move in the disk device 30. In the followings, with reference to FIGS. 10 to 12, the configuration and the process of a file server 10A of the second embodiment will be described. FIG. 10 is a block diagram illustrating the configuration of the file server according to the second embodiment. FIG. 11 is a flowchart illustrating the operation of a dividing unit changing process performed by the file server according to the second embodiment. FIG. 12 is a flowchart illustrating the processing operation of the file sever according to the second embodiment.

As illustrated in FIG. 10, the file server 10A differs from the file server 10 illustrated in FIG. 2 in that the file server 10A includes a calculating module 13g and a deciding module 13h. The calculating module 13g of the file server 10A divides the storage area in the disk device by a plurality of dividing units in a given period of time and calculates a rate of an area where the load by access requests in a given time zone is equal to or more than a certain level for each of the dividing units. The calculating module 13g then calculates the standard deviation of the rate of the area where the load during the given period of time is equal to or more than a certain level for each of the dividing units.

For example, the calculating module 13g divides the storage area in the disk device by the dividing units of 1 GB, 2 GB, 4 GB, 8 GB, 16 GB, 32 GB, and 64 GB in a period of one week. The calculating module 13g then calculates the rate of an area where the load by access requests from 12:00 to 18:00 is equal to or more than 1 iops on average for each of the dividing units. The calculating module 13g calculates the standard deviation of the rate of a hot spot, which is an area where the load during the period of one week is 1 iops or greater on average, for each dividing unit. The calculating module 13g further calculates the average value of the rates of areas where the load during the period of one week are equal to or greater than a certain level for each dividing unit.

The deciding module 13h decides a range of areas of the storage area in the disk device divided by the smallest dividing unit out of the dividing units that render the standard deviation calculated by the calculating module 13g to be equal to or less than a given threshold value as a range of areas for the logical addresses and the physical addresses stored in the conversion table 13f. For example, the deciding module 13h determines whether the average value of the load by the access requests is zero for all of the dividing units. When the average value of the load by the access requests for all of the dividing units is zero as a result, it means there is no hot spot present where the load is 1 iops or greater on average, and thus the deciding module 13h determines the dividing unit to be an initial value of 1 GB. The hot spot here means, as described above, a storage area of high access frequency where the load by access requests is 1 iops or greater on average.

When the average value of the load by the access requests for all of the dividing units is not zero, the deciding module 13h further determines whether a dividing unit is present that renders all of the standard deviations to be equal to or less than five. In other words, the deciding module 13h determines whether the rate of the area where the CPU load is 1 iops or greater on average fluctuates with time.

Accordingly, when there is no dividing unit present that renders the standard deviation to be five or less, the deciding module 13h selects 64 GB, which is the largest dividing unit, as the dividing unit. In other words, because the rate of the area with an average of 1 iops or greater fluctuates with time even by any of the dividing units, the largest dividing unit of 64 GB is selected as the dividing unit. This is because, when the standard deviation exceeds five, the fluctuations exceed the range of the dividing unit, and thus the corresponding dividing unit is not be used.

Meanwhile, when there is a dividing unit that renders the standard deviation to be five or less is present, the file server 10A selects the smallest dividing unit out of the dividing units that render the standard deviation to be five or less. For example, when all of the standard deviations of 8 GB, 16 GB, 32 GB, and 64 GB are five or less, 8 GB is selected as the dividing unit. This is because, when the standard deviation is five or less, the fluctuations fall within the range of the dividing unit, and thus the corresponding dividing unit can be used.

The process performed by the file server 10A according to the second embodiment will be explained. As illustrated in FIG. 11, the file server 10A divides a disk volume of the disk device 30 by the unit of 1 GB, and stores data of the number of accesses executed from 12:00 to 18:00 in a one-minute interval for each dividing unit (step S201). The file server 10A then divides the area of the disk volume of the disk device 30 by 1 GB, 2 GB, 4 GB, 8 GB, 16 GB, 32 GB, and 64 GB. The file server 10A calculates the rate with an average of 1 iops or greater on the data of the number of accesses stored from 12:00 to 18:00 for each of the dividing units (step S202).

The file server 10A then determines whether the data of the number of accesses stored from 12:00 to 18:00 for one week is stored (step S203). When it is not determined that the data for one week is stored as a result (No at step S203), the file server 10A returns to step S201 and repeats the processes of steps S201 to S203 until the data for one week is stored. Meanwhile, when it is determined that the data for one week is stored (Yes at step S203), the file server 10A calculates the average value and the standard deviation for one week for each of the dividing units of 1 GB, 2 GB, 4 GB, 8 GB, 16 GB, 32 GB, and 64 GB (step S204).

The file server 10A then determines whether the average value for all of the dividing units is zero (step S205). When it is determined that the average value for all of the dividing units is zero as a result (Yes at step S205), the file server 10A finishes processing leaving the dividing unit as 1 GB because there is no hot spot present where the load is 1 iops or greater on average. When it is not determined that the average value for all of the dividing units is zero (No at step S205), the file server 10A further determines whether a dividing unit that renders the standard deviation to be five or less is present (step S206). In other words, the file server 10A determines whether the rate of the CPU load with an average of 1 iops or greater fluctuates with time.

As a result, when there is no dividing unit present that renders the standard deviation to be five or less (No at step S206), the file server 10A selects 64 GB as the dividing unit (step S208). In other words, because the rate of the load with an average of 1 iops or greater fluctuates with time even by any of the dividing units, the largest dividing unit of 64 GB is selected as the dividing unit.

Furthermore, when a dividing unit that renders the standard deviation to be five or less is present (Yes at step S206), the file server 10A selects the smallest dividing unit out of the dividing units that render the standard deviation to be five or less (step S207).

With reference to FIG. 12, explained is the process of changing the dividing unit for the logical addresses and the physical addresses in the conversion table 13f to the dividing unit decided when the dividing unit is changed. In the example in FIG. 12, an explanation is made with the dividing unit changed to be A GB. As indicated in FIG. 12, the file server 10A divides the disk volume of the disk device 30 by the unit of A GB (step S301). The file server 10A stores the number of accesses for one day for each of the areas divided into A GB (step S302).

The file server 10A then carries out reordering of the storage areas of data on the disk device 30 in a descending order of areas of a higher number of accesses, and updates the conversion table 13f based on the result of the reordering performed (step S303). Thereafter, when an access is requested, the file server 10A obtains the physical address based on the logical address in accordance with the conversion table 13f updated and carries out the access to the desk device 30.

Consequently, even when access areas are fluctuated with time, the file server 10A changes the storage areas of data on the disk device 30 by an appropriate dividing unit, thereby making it possible to enhance the access performance.

[c] Third Embodiment

In the first embodiment, it has been explained that the updating process of the conversion table and the changing process of the data storage areas in the disk device are carried out every given time interval. However, the embodiment is not restricted to this, and the updating process of the conversion table and the changing process of the data storage areas in the disk device may be carried out only when a certain increase in performance can be expected.

A third embodiment of the invention in the followings provides an example of determining whether the difference between a physical address before being updated and a physical address after being updated is equal to or more than a given threshold value if the conversion table is updated so as to determine whether to carry out the updating process of the conversion table and the changing process of the data storage areas in the disk device. In other words, by determining whether a certain increase in performance can be expected if the data storage areas in the disk device are changed, the updating process and the changing process are carried out only when the certain increase in performance can be expected.

Figure 13:
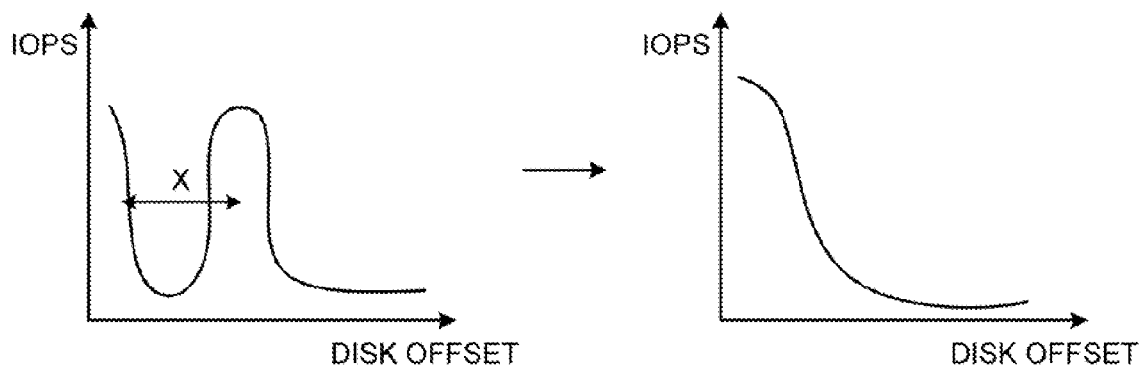
FIG. 13 illustrates graphs for explaining the process of determining whether to perform a reordering process based on the distance between hot spots.
Figure 14:
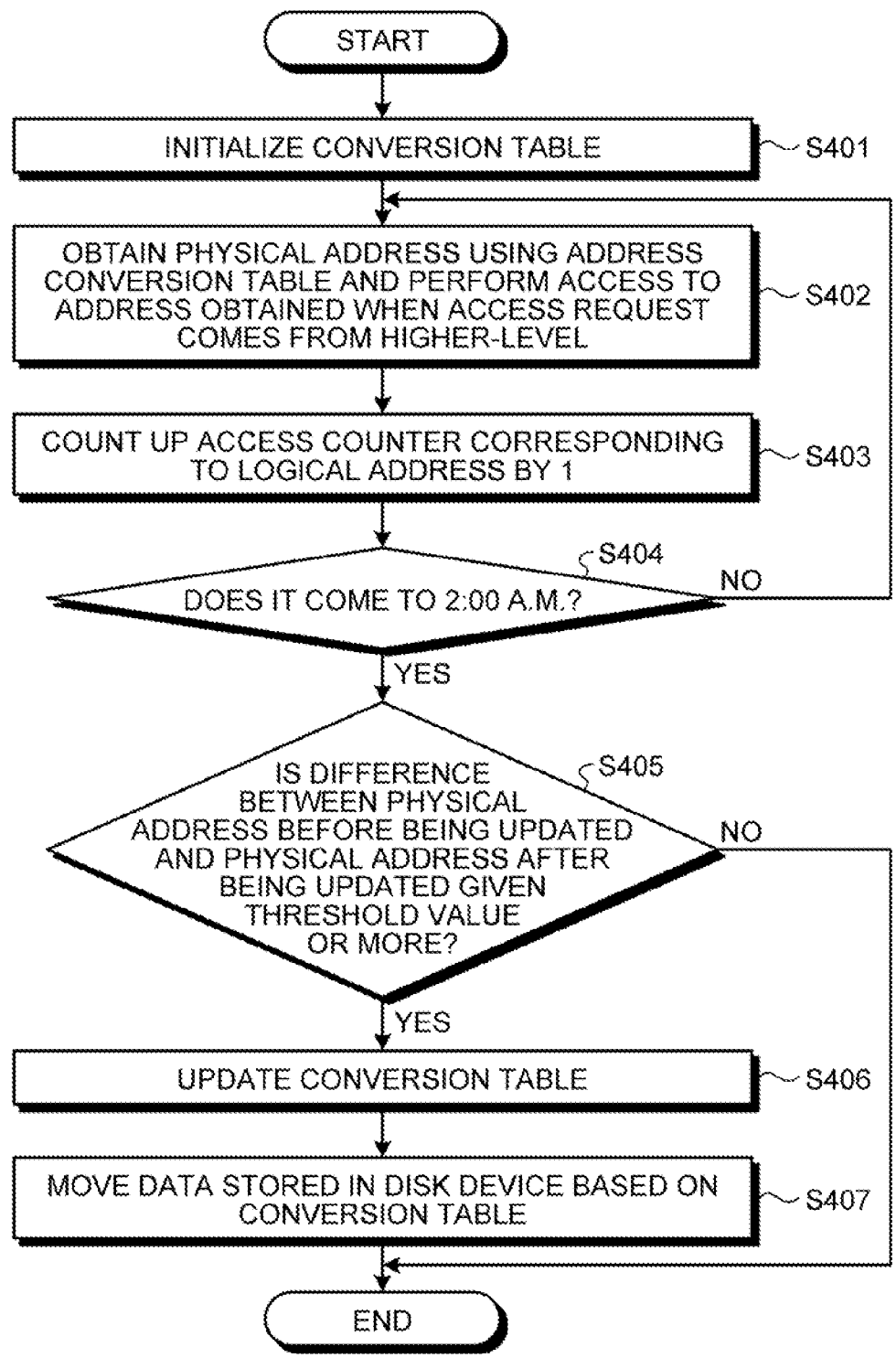
FIG. 14 is a flowchart illustrating a processing operation of a file server according to a third embodiment of the invention.

In the followings, the process performed by a file server according to the third embodiment will be explained with reference to FIGS. 13 and 14. FIG. 13 illustrates graphs for explaining the process of determining whether to carry out the reordering process based on the distance between hot spots. FIG. 14 is a flowchart illustrating the processing operation of the file server according to the third embodiment. The configuration of the file server of the third embodiment is the same as that of the file server 10 depicted in FIG. 2, and thus its explanation is omitted.

As described above, in the file server according to the third embodiment, the updating process of the conversion table and the changing process of the data storage areas in the disk device 30 are carried out only when a certain increase in performance can be expected. In other words, because the updating process of the conversion table is carried out and the changing process of the data storage areas in the disk device 30 is carried out to reorder the data, the processing may become heavy. To cope with this, in the file server according to the third embodiment, the updating process of the conversion table and the changing process of the data storage areas in the disk device are not carried out every time it comes to 2:00 a.m. as explained in the first embodiment, but the updating process and the changing process are carried out only when a certain increase in performance can be expected.

For example, in the file server according to the third embodiment, a fluctuation range of data is obtained in advance in which an increase of 10% or more in access performance can be expected. The fluctuation range of data in which an increase of 10% or more in the access performance can be expected here is assumed to be X GB. The fluctuation range means a range between the peaks of hot spots. As exemplified in the left graph in FIG. 13, when there are two hot spots dispersed in the disk device and the distance between the hot spots is equal to or more than X GB, the updating process of the conversion table and the changing process of the data storage areas in the disk device are carried out. As a consequence, as exemplified in the right graph in FIG. 13, the dispersed hot spots are concentrated in specific areas, and thus it allows an increase of 10% or more in the access performance to be expected. In the example illustrated in FIG. 13, the abscissa axes represent the disk offset of the disk device and the ordinate axes represent the iops at each disk offset.

In the file server according to the third embodiment, to identify the distance between the hot spots, the difference between a physical address before being updated and a physical address after being updated is obtained. For example, in the file server according to the third embodiment, the threshold value of the fluctuation range of data in which an increase of 10% or more in the access performance can be expected is assumed to be set as 3 GB. When the file server according to the third embodiment updates the physical address corresponding to the logical address 1 from 1 to 6 by the updating process of the conversion table 13$f$, the data is moved by 5 GB, which is greater than the threshold value of 3 GB. Accordingly, the file server according to the third embodiment carries out the updating process of the table and carries out the changing process of the data storage areas in the disk device 30.

With reference to FIG. 14, the process performed by the file server according to the third embodiment will be explained. As indicated in FIG. 14, the file server according to the third embodiment first initializes the conversion table 13$f$ similarly to the first embodiment (step S401). When an access is requested, the file server accesses the disk device 30 (step S402), and counts up the number of accesses (step S403).

Thereafter, after it comes to 2:00 a.m. (Yes at step S404), the file server according to the third embodiment determines, at the time of updating the conversion table 13$f$, whether the difference between the physical address before being updated and the physical address after being updated is equal to or more than a given threshold value (step S405). When the difference between the physical address before being updated and the physical address after being updated is not equal to or more than the given threshold value (No at step S405), the file server according to the third embodiment finishes processing without carrying out the updating process and the changing process because an increase of 10% or more in the access performance is not be expected.

Furthermore, when the difference between the physical address before being updated and the physical address after being updated is the given threshold value or greater (Yes at step S405), the file server according to the third embodiment updates the conversion table 13$f$ only for the portions where an increase of 10% or more in the access performance can be expected (step S406). The file server according to the third embodiment then changes the storage areas of the data stored in the disk device 30 based on the conversion table 13$f$ updated (step S407).

Consequently, when not much increase in the access performance is expected from changing the storage areas of data, it is possible to cancel the updating of the conversion table 13$f$, which prevents a processing burden imposed by changing the storage areas of the data.

[d] Fourth Embodiment

While the embodiments of the invention have been described in the foregoing, the invention may be implemented in various different embodiments other than the embodiments described above. In the followings, different embodiments will be explained.

(1) Process Timing

While the updating process of the conversion table and the changing process of the data storage areas in the disk device are exemplified to be carried out once a day at the timing of reaching 2:00 a.m. in the first embodiment, the invention is not restricted to this example. For example, the file server may carry out the updating process and the changing process a plurality of times a day, or may carry out the updating process of the conversion table and the changing process of the data storage areas in the disk device once in a few days.

(2) System Configuration, Etc.

Each of the constituent elements of each device illustrated in the drawings is functionally conceptual and is not necessarily configured physically as illustrated in the drawings. In other words, the specific embodiments of distribution and integration of devices are not restricted to those illustrated, and the whole or a part thereof can be configured by being functionally or physically distributed or integrated in any unit in accordance with various types of loads and usage. For example, the counting module 13$a$ and the updating module 13$b$ may be integrated. Furthermore, the whole or any part of each of the processing functions carried out in the respective devices can be realized by a CPU and a computer program analyzed and executed by the CPU or can be realized by a wired logic as hardware.

(3) Computer Program

The various processes explained in the above embodiments can be realized by a computer system such as a personal computer and a workstation executing a computer program prepared in advance. Accordingly, a computer system that executes a computer program having the same functions as those of the above embodiments will be explained in the followings as another embodiment.

Figure 15:
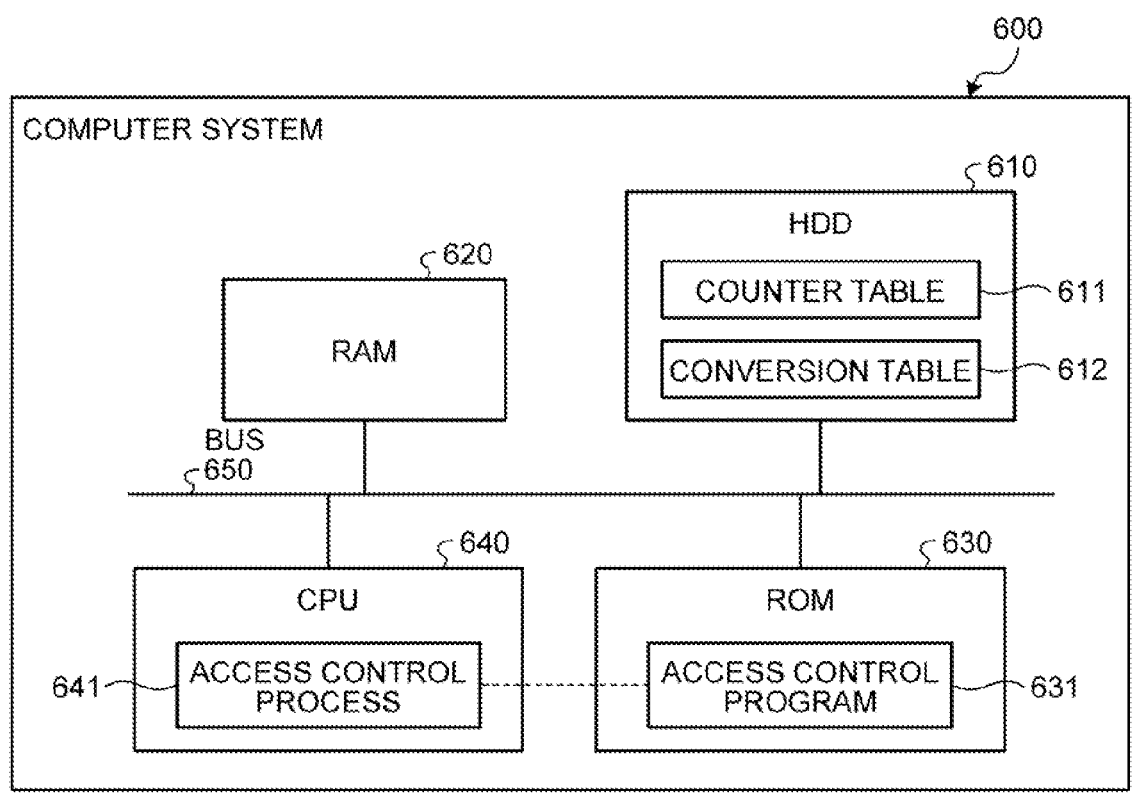
FIG. 15 is a block diagram illustrating a computer that executes an access control program.
Figure 16:
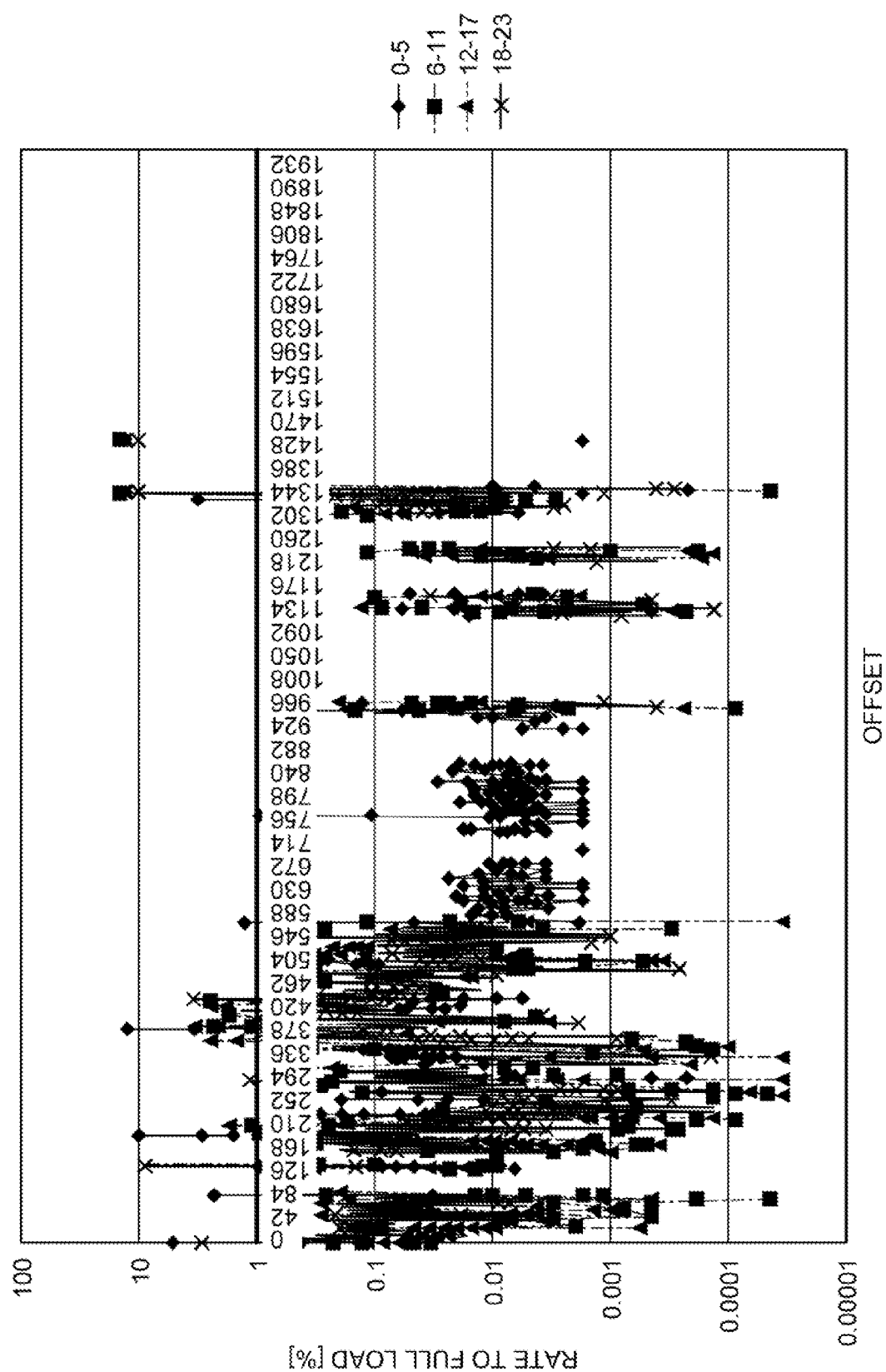
FIG. 16 is a chart for explaining a tendency of access requests from client terminals.

As illustrated in FIG. 15, a computer system 600 is constructed with an HDD 610, a RAM 620, a ROM 630, and a CPU 640, and the foregoing components are connected with one another via a bus 650. The ROM 630 here stores therein in advance a computer program that exercises the same functions as those of the above embodiments, more specifically, as indicated in FIG. 15, an access control program 631.

In the CPU 640, by reading and executing the access control program 631, an access control process 641 is brought out as indicated in FIG. 15. By reading out the access control program 631 and executing the access control process 641, the same processes are executed as those of the counting module 13$a$, the updating module 13$b$, the changing module 13$c$, and the accessing module 13$d$ illustrated in FIG. 2 described in the foregoing.

The HDD 610 stores therein a counter table 611 and a conversion table 612. The CPU 640 registers data to the counter table 611 and the conversion table 612, reads out the counter table 611 and the conversion table 612 to store the data in the RAM 620, and executes the processes based on the data stored in the RAM 620.

The access control program 631 is not necessarily stored in the ROM 630. For example, by storing the program in a portable physical medium to be inserted to the computer system 600 such as a flexible disk (FD), a CD-ROM, an MO disk, a DVD disk, a magneto optical disc, and an IC card, the computer system 600 may read out the program therefrom to execute the program. Furthermore, by storing the program in a fixed physical medium such as a hard disk drive (HDD) provided inside or outside of the computer system 600, or in another computer system connected to the computer system 600 via a public line, the Internet, a LAN, a WAN, or the like, the computer system 600 may read out the program therefrom to execute the program.

The access performance to a recording medium by the device driver can be enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing an access control program causing a computer to perform:
    accessing a storage device with a storage area indicated by second address information as an access destination, when a device driver receives an access request to the storage device from a higher-level layer, by referring to a storage module that stores therein a correspondence relationship between a first address specified by kernel and a second address converted from the first address that are address information indicative of a storage area in the storage device and by converting the first address information included in the access request to the second address information;
    counting number of access requests to each storage area from the higher-level layer to the device driver in a given period of time for each piece of the first address information;
    updating the correspondence relationship in the storage module such that the second address information is lined up in a descending order of the first address information of a higher number of the access requests counted;
    calculating standard deviation of a rate of an area where a load caused by access requests is equal to or more than a certain level in a given period of time for each dividing unit by dividing a storage area in the storage device by a plurality of dividing units and by calculating the rate of the area where the load is equal to or more than the certain level in a given time zone for each of the dividing units in the given period of time;
    deciding a smallest dividing unit out of the dividing units that are determined to have the standard deviation of equal to or less than a given threshold value as a range of area for the first address information and the second address information of the correspondence relationship stored in the storage module by determining whether each standard deviation calculated is equal to or less than the given threshold value; and
    changing storage areas of data stored in the storage device based on the correspondence relationship updated.

2. The computer-readable, non-transitory medium storing the access control program according to claim 1, further causing the computer to perform determining whether a difference between the second address information before a change and the second address information after the change is equal to or more than a given threshold value at a time of updating the correspondence relationship, and updating the correspondence relationship when the difference is equal to or more than the given threshold value and cancelling an update of the correspondence relationship when the difference is not equal to or more than the given threshold value.

3. The computer-readable, non-transitory medium storing the access control program according to claim 1, further causing the computer to perform updating the correspondence relationship such that the second address information is lined up from an outer circumference of the storage device towards an inner circumference thereof in a descending order of the first address information of a higher number of the access requests counted.

4. The computer-readable, non-transitory medium storing the access control program according to claim 2, further causing the computer to perform updating the correspondence relationship such that the second address information is lined up from an outer circumference of the storage device towards an inner circumference thereof in a descending order of the first address information of a higher number of the access requests counted.

5. An access control method for controlling an access to a storage device performed by an information processing apparatus, the access control method comprising:
    accessing the storage device with a storage area indicated by second address information as an access destination, when a device driver receives an access request to the storage device from a higher-level layer, by referring to a storage module that stores therein a correspondence relationship between a first address specified by kernel and a second address converted from the first address that are address information indicative of a storage area in the storage device and by converting the first address information included in the access request to the second address information;
    counting number of access requests to each storage area from the higher-level layer to the device driver in a given period of time for each piece of the first address information;
    updating the correspondence relationship in the storage module such that the second address information is lined up in a descending order of the first address information of a higher number of the access requests counted;
    calculating standard deviation of a rate of an area where a load caused by access requests is equal to or more than a certain level in a given period of time for each dividing unit by dividing a storage area in the storage device by a plurality of dividing units and by calculating the rate of the area where the load is equal to or more than the certain level in a given time zone for each of the dividing units in the given period of time;
    deciding a smallest dividing unit out of the dividing units that are determined to have the standard deviation of equal to or less than a given threshold value as a range of area for the first address information and the second address information of the correspondence relationship stored in the storage module by determining whether each standard deviation calculated is equal to or less than the given threshold value; and
    changing storage areas of data stored in the storage device based on the correspondence relationship updated.

6. An information processing apparatus comprising:
    a device driver that controls an access to a storage device, the device driver including:
    a storage module that stores therein a correspondence relationship between a first address specified by kernel and a second address converted from the first address that are address information indicative of a storage area in the storage device;

an accessing module that accesses the storage device with a storage area indicated by second address information as an access destination, when the device driver receives an access request to the storage device from the higher-level layer, by referring to the storage module and by converting the first address information included in the access request to the second address information;

a counting module that counts number of the access requests to each storage area in a given period of time for each piece of the first address information;

an updating module that updates the correspondence relationship in the storage module such that the second address information is lined up in a descending order of the first address information of a higher number of the access requests counted by the counting module;

a calculating module that calculates standard deviation of a rate of an area where a load caused by access requests is equal to or more than a certain level in a given period of time for each dividing unit by dividing a storage area in the storage device by a plurality of dividing units and by calculating the rate of the area where the load is equal to or more than the certain level in a given time zone for each of the dividing units in the given period of time;

a deciding module that decides a smallest dividing unit out of the dividing units that are determined to have the standard deviation of equal to or less than a given threshold value as a range of area for the first address information and the second address information of the correspondence relationship stored in the storage module by determining whether each standard deviation calculated is equal to or less than the given threshold value; and a changing module that changes storage areas of data stored in the storage device based on the correspondence relationship updated by the updating module.

7. An information processing apparatus comprising:

a processor; and a memory that stores therein a correspondence relationship between a first address specified by kernel and a second address converted from the first address that are address information indicative of a storage area in the storage device, wherein the processor executes:

accessing the storage device with a storage area indicated by second address information as an access destination, when the device driver receives an access request to the storage device from the higher-level layer, by referring to the memory and by converting the first address information included in the access request to the second address information;

counting number of access requests to each storage area from the higher-level layer to the device driver in a given period of time for each piece of the first address information;

updating the correspondence relationship in the storage module such that the second address information is lined up in a descending order of the first address information of a higher number of the access requests counted;

calculating standard deviation of a rate of an area where a load caused by access requests is equal to or more than a certain level in a given period of time for each dividing unit by dividing a storage area in the storage device by a plurality of dividing units and by calculating the rate of the area where the load is equal to or more than the certain level in a given time zone for each of the dividing units in the given period of time;

deciding a smallest dividing unit out of the dividing units that are determined to have the standard deviation of equal to or less than a given threshold value as a range of area for the first address information and the second address information of the correspondence relationship stored in the storage module by determining whether each standard deviation calculated is equal to or less than the given threshold value; and changing storage areas of data stored in the storage device based on the correspondence relationship updated.

* * * * *